May 21, 1963 C. L. FARRAR ETAL 3,090,454
SCALE LUGGAGE HANDLE
Filed May 11, 1960
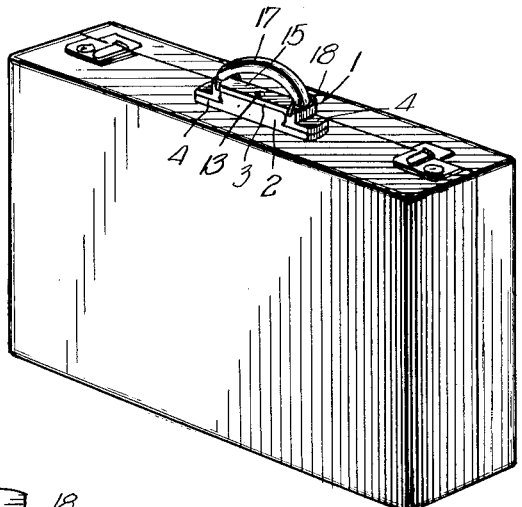
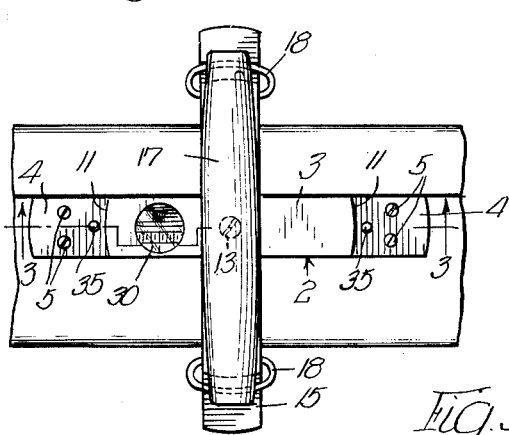
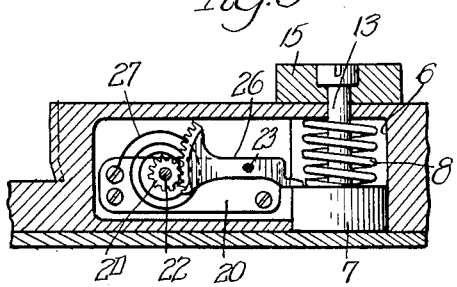
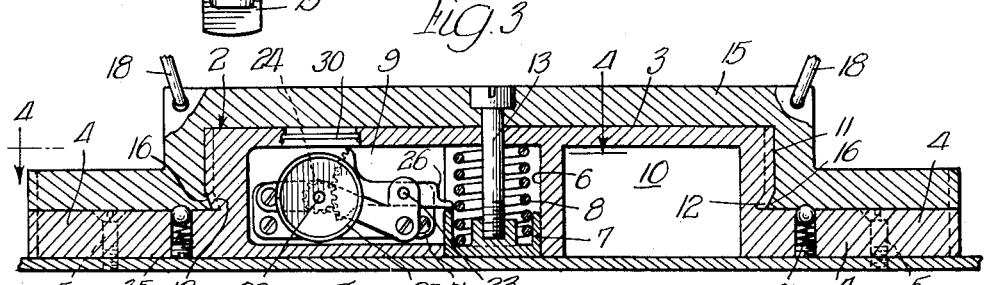
INVENTORS.
Clayton L. Farrar,
BY Gordon V. Marlow
George H. Simmons
Atty

United States Patent Office 3,090,454
Patented May 21, 1963

3,090,454
SCALE LUGGAGE HANDLE
Clayton L. Farrar, 4222 Waban Hill, and Gordon V. Marlow, 110 E. Main St., both of Madison, Wis.
Filed May 11, 1960, Ser. No. 28,338
8 Claims. (Cl. 177—131)

This invention relates to a scale handle for luggage and has for its principal object the provision of a new and improved device of this kind.

It is a main object of the invention to provide a luggage scale handle which in one position functions solely as a handle which conceals the scale means and in which that means is exposed and rendered operative by turning the handle from normal to weighing position thereby to permit weighing the luggage.

Another object of the invention is to provide a luggage scale handle that permits weighing the luggage by grasping the handle and lifting the luggage thereby when the handle is in weighing position.

Another object of the invention is to provide a luggage scale handle that is of pleasing design and enhances rather than detracts from the appearance of the luggage when attached thereto.

Another object of the invention is to provide a luggage scale handle that is light in weight and can be manufactured at low cost without sacrificing quality.

Further objects of the invention not specifically mentioned here will be apparent from the detailed description and claims which follow, reference being had to the accompanying drawings in which a preferred embodiment of the invention is shown by way of example and in which:

FIG. 1 is a view of a piece of luggage with the scale handle attached thereto;

FIG. 2 is a fragmentary plan view of the luggage with the scale handle in weighing position;

FIG. 3 is a cross sectional view along the line 3—3 of FIG. 2, looking in the direction of the arrows, with the handle in normal position, and drawn to an enlarged scale;

FIG. 4 is a cross sectional view along the line 4—4 of FIG. 3, looking in the direction of the arrows; and FIG. 5 is a cross sectional view along the line 5—5 of FIG. 4, looking in the direction of the arrows.

Weight restrictions governing the amount of luggage that can be carried free by common carriers, particularly in air travel, render highly desirable the provision of means for accurately and conveniently weighing the luggage so that the allowable weight may be fully utilized. The present invention seeks to provide such a device.

In the prior art of which we are aware are numerous devices incorporating luggage equipped with scales through which the weight of the luggage can be determined. Such prior art devices detract from the appearance of the luggage and either are difficult to use or the weighing device is stressed each time the luggage is picked up by the handle even though no weighing is involved.

The device of the present invention provides a scale handle for luggage which in normal position permits handling the luggage without stressing the weighing device in any manner. When weighing of the luggage is required, the handle is easily turned from normal to weighing position thereby to expose to view the weighing device which is completely concealed when the handle is in normal position. Movement of the handle to weighing position also releases the weighing device so that the weight of the luggage operates that device to accurately indicate the weight.

The invention will be best understood by reference to the accompanying drawings, which in FIG. 1 show the device of the present invention installed upon a typical piece of luggage, as indicated at 1. This device consists of a base 2 having a central portion 3 from the ends of which are projections 4 of reduced dimension and containing perforations through which attaching means such as bolts, screws or rivets are extended to attach the base to the luggage, as indicated at 5.

Disposed within the central portion 2 of the base and centered on the center thereof is a bore 6 in which a plunger 7 and a compression spring 8 are disposed. Also within the central portion 3 of the base is a cavity 9 which opens into the bore and in which the weighing mechanism is disposed. As shown, the base contains an additional cavity 10 solely for the purpose of reducing the weight thereof.

It will be noted, particularly in FIG. 2, that the ends 11 of the central portion 3 of the base are formed as arcs centered upon the center of the base. As will be seen best in FIG. 3, grooves 12 are formed at the junction of the rounded ends 11 and end portions 4 of the base.

Registered with the base 2 is a handle frame 15 shaped to engage the upper surface of the central portion 3 and end portions 4 of the base and having arcuate portions dimensioned for sliding fit with the rounded ends 11 of the base. Tongues 16 carried by the frame portion 15 project into the grooves 12 to prevent movement of the frame 15 vertically with respect to the base when these members are registered together as shown.

A stud screw 13 projects through perforations in the frame 15 and end wall of the bore 6 and is threaded into the plunger 7 to pivotally mount the frame upon the base. A handle 17, shown as a conventional leather covered luggage handle, is attached to the frame 15 by bails 18.

As shown, the weighing device consists of spaced apart mounting plates 20 and 21, best seen in FIG. 4, between and through which shafts 22 and 23 are extended. Shaft 22 carries a pinion 24 and a calibrated drum 25. Shaft 23 carries a rack 26 that is engaged with the pinion 24 and overhangs the upper edge of the plunger 7 in the bore. A hair spring 27 encircles the shaft 22 and functions to return the apparatus to normal from operated position.

When it is desired to weigh the luggage, handle 17 and frame 15 are rotated around the axis of stud screw 16 from the normal position in alignment with the base to the position shown in FIG. 2, that is, a position at substantially right angles to the base. This rotation exposes a window 30 in the upper surface of the central portion 3 of the base, through which window the drum 25 is visible. The window may consist of glass or a plastic and may be a lens, if desired.

Since the tongues 16 are disengaged from the grooves 12, when the handle is in weighing position, lifting the luggage by the handle causes the weight thereof to move the plunger 7 upwardly in the bore and thereby compress the spring 8. This movement rocks the ratchet lever 26 counterclockwise around the shaft 23 thereby to drive the pinion 24 and drum 25 clockwise, as seen in FIG. 3. When the resistance of the spring 8 equals the weight of the luggage, the system comes to rest and the weight can be read on the drum through the window 30.

Preferably the gear ratio of the rack and pinion is such that the drum will be moved through 360° as the plunger 7 is moved upwardly from the position shown in FIG. 3 to the position in which the spring 8 goes solid by engagement of adjacent convolutions thereof together. The number of pounds reuired to produce this movement of the plunger will depend upon the stiffness of the spring 8, and it is contemplated that the device will be constructed to weigh different weights. Thus, for example, the spring might be of such stiffness as to require fifty pounds for movement into solid position and the drum might be calibrated to indicate weight between twenty-five and fifty pounds. Thus, when weighing luggage of less than twenty-five pounds, the spring will not be compressed appreciably and therefore the dial for the drum will not be rotated.

A piece of luggage weighing fifty pounds is extremely heavy and it is contemplated that scale handles having a lower weight range, say from fifteen to forty pounds, will be more popular.

As shown in the drawings, particularly FIGS. 2 and 3, when the frame 15 is registered with the base it is retained by spring pressed means 35, so that accidental movement of the frame out of registration with the base is not likely. While this form of retainer is advantageous in that the holding device is completely concealed when the handle is in normal position and further for the fact that no buttons or levers need be operated to release the handle, the use of other types of retaining means is contemplated.

The base 2 and the frame 15 may be formed by die casting of a lightweight material, such as aluminum or an aluminum alloy, or if desired may be composed of a rugged plastic such as a thermosetting phenol condensation product.

The device may be plated or colored to match the color of the luggage or to contrast therewith, as desired. When installed upon the luggage, the appearance thereof is not deteriorated.

As shown in the drawings, cavity 9 opens into the side of the central portion 3 of the base and is enclosed by a plate 36 secured therein in convenient manner such as by screws. This arrangement is advantageous in that it permits access to the cavity and weighing mechanism contained therein, even though the base be attached to the luggage in permanent fashion such as by rivets. It is contemplated, however, that it may be desirable to have the cavity 9 open in the bottom surface of the base, in which case the cavity will be closed by the luggage itself and a closure plate such as 36 will not be necessary.

From the foregoing, it will be apparent that the device of the present invention provides a scale handle for luggage in which, when the handle is in normal position, the scale device is not stressed at all. Then when it is desired to weigh the luggage, the handle can be rotated to weighing position and the luggage lifted by grasping the handle. With the handle centered upon the longitudinal and transverse median lines of the luggage, proper balance is achieved and the weight of the luggage accurately indicated. When in normal position, the weighing device is completely concealed.

While we have shown and described a preferred embodiment of our invention, we have done so by way of example only, as there are many modifications and adaptations which can be made by one skilled in the art within the teachings of the invention.

Having thus complied with the statutes and shown and described a preferred embodiment of our invention, what we consider new and desire to have protected by Letters Patent is pointed out in the appended claims.

What we claim is:

1. The combination of a luggage unit having a flat upper surface; a pair of normally registered and interengaged members, the first of which is fixed on the upper surface of the luggage and the second is fixed upon the first for rotation around a vertical axis located at the centers of the members; and normally inoperative weighing means disposed within said first member and rendered operative by rotating the second member with respect to the first into weighing position; and a luggage handle fixed to said second member.

2. A device as specified in claim 1, in which the weighing device includes a calibrated spring compressed by the weight of the luggage when the second member is in weighing position and weighing means operated as the spring is compressed to indicate the weight of the luggage.

3. A device as specified in claim 2, in which rotation of the second member into weighing position disengages the members to permit relative vertical movement therebetween thereby to render possible compression of the spring.

4. A device as specified in claim 3, in which a plunger fixed with respect to the second member is moved with respect to the first member by the weight of the luggage when the second member is in weighing position to compress the spring and in which the weighing means is operated by movement of the plunger.

5. A device as specified in claim 4, in which the weighing device includes a calibrated drum that is rotated by a pivoted rack which engages the plunger and is moved by movement thereof.

6. A luggage handle scale comprising: a base containing a bore and a cavity; a handle frame registered with said base; a handle disposed above the frame and attached thereto; a plunger and spring disposed in said bore; a stud screw threaded into said plunger and extending through perforations in the base and frame to pivotally mount the frame upon the base; and a weight indicating device mounted in said cavity and engaging said plunger, said device being operated by movement of the plunger to indicate the weight of the luggage when the frame and handle are rotated to a position at substantially right angles to the base.

7. A luggage handle and scale comprising: a rectangular base having end portions and a central portion rising above said end portions and having rounded ends and a flat top surface, there being grooves in the ends of said central portion adjacent the junctions of the end portions therewith; a generally C-shaped handle frame registered with said base and engaging the upper surface of said central and end portions and said rounded ends; tongues on said frame extending into said grooves to prevent the frame from being lifted vertically off of the base; a handle attached to said frame, said base containing a bore and a cavity opening into said bore; a plunger in said bore and having sliding fit therein; a compression spring engaging said plunger and the upper end of said bore; a stud screw extended through perforations in said frame and the end of said bore and threaded into said plunger, said frame being rotatable around said stud out of registration with said base into weighing position; scale means in said cavity; and a window in said base through whch the scale means is visible when the frame and handle are in weighing position.

8. A device as specified in claim 7, in which the scale means includes a calibrated drum fixed upon a rotatable shaft, a pinion fixed upon said shaft, a pivoted rack engaging said pinion and the plunger, said rack rotating said drum as the weight of the luggage moves the plunger upwardly in the bore against the resistance of said spring, thereby to indicate the weight of the luggage.

References Cited in the file of this patent

UNITED STATES PATENTS

| | | |
|---|---|---|
| 2,518,973 | Atherton | Aug. 15, 1950 |
| 2,937,016 | Westman | May 17, 1960 |

FOREIGN PATENTS

| | | |
|---|---|---|
| 531,634 | Canada | Oct. 9, 1956 |
| 338,631 | Germany | June 28, 1921 |